US008959644B2

(12) United States Patent
Schechter et al.

(10) Patent No.: US 8,959,644 B2
(45) Date of Patent: Feb. 17, 2015

(54) USE OF POPULARITY INFORMATION TO REDUCE RISK POSED BY GUESSING ATTACKS

(75) Inventors: Stuart E. Schechter, Kirkland, WA (US); Cormac E. Herley, Bellevue, WA (US); Michael D. Mitzenmacher, Lexington, MA (US)

(73) Assignee: Microsoft Corporation, Redmond, WA (US)

( * ) Notice: Subject to any disclaimer, the term of this patent is extended or adjusted under 35 U.S.C. 154(b) by 327 days.

(21) Appl. No.: 12/912,782

(22) Filed: Oct. 27, 2010

(65) Prior Publication Data
US 2012/0110668 A1     May 3, 2012

(51) Int. Cl.
*G06F 21/00*        (2013.01)

(52) U.S. Cl.
CPC ........................................ *G06F 21/00* (2013.01)
USPC ...... 726/25; 726/5; 726/18; 726/19; 713/182; 713/183

(58) Field of Classification Search
USPC ........ 726/25, 2–4, 22–23, 5, 18, 19; 713/182, 713/183
See application file for complete search history.

(56) References Cited

U.S. PATENT DOCUMENTS

| 6,532,214 | B1 * | 3/2003 | Rumsewicz | 370/236 |
|---|---|---|---|---|
| 7,523,499 | B2 * | 4/2009 | Wilkins et al. | 726/23 |
| 8,555,357 | B1 * | 10/2013 | Gauvin | 726/6 |
| 2005/0114678 | A1 * | 5/2005 | Bagga et al. | 713/183 |
| 2009/0024555 | A1 * | 1/2009 | Rieck et al. | 706/54 |
| 2009/0150971 | A1 * | 6/2009 | Vedula et al. | 726/1 |
| 2009/0172788 | A1 * | 7/2009 | Vedula et al. | 726/5 |
| 2009/0241196 | A1 | 9/2009 | Troyansky et al. | |
| 2009/0265559 | A1 | 10/2009 | Hwang | |
| 2010/0138443 | A1 | 6/2010 | Ramakrishnan et al. | |

OTHER PUBLICATIONS

Schechter et al., "It's no secret: Measuring the security and reliability of authentication via 'secret' questions," Proceedings of the 2009 IEEE Symposium on Security and Privacy, May 2009, 17 pages.*
Manber et al., "An Algorithm for Approximate Membership Checking With Application to Password Security," Information Processing Letters, 1994, 10 pages.*

(Continued)

*Primary Examiner* — Mohammad A Siddiqi
(74) *Attorney, Agent, or Firm* — Sandy Swain; Judy Yee; Micky Minhas

(57) ABSTRACT

A popularity determination module (PDM) is described which reduces the effectiveness of statistical guessing attacks. The PDM operates by receiving a password (or other secret information item) from a user. The PDM uses a model to determine whether the password is popular among a group of users. If so, the PDM may ask the user to select another password. In one implementation, the model corresponds to a probabilistic model, such a count-min sketch model. The probabilistic model provides an upper-bound assessment of a number of times that a password has been encountered. Further, the probabilistic model provides false positives (in which passwords are falsely assessed as popular) at a rate that exceeds a prescribed minimum rate. The false positives are leveraged to reduce the effectiveness of statistical guessing attacks by malicious entities.

20 Claims, 12 Drawing Sheets

(56) References Cited

OTHER PUBLICATIONS

Provos, et al., "A Future-Adaptable Password Scheme," retrieved at <<http://www.usenix.org/events/usenix99/provos/provos.pdf>>, Proceedings of the FREENIX Track: 1999 USENIX Annual Technical Conference, Jun. 1999, 13 pages.
Weir, Charles Matthew, "Using Probabilistic Techniques to Aid in Password Cracking Attacks," retrieved at <<http://etd.lib.fsu.edu/theses/available/etd-04142010-194235/unrestricted/Weir_C_Dissertation_2010.pdf>>, Dissertation, Florida State University, 2010, 139 pages.
Ullrich, Johannes, "Some Thoughts About Passwords," retrieved at <<http://blogs.sans.org/appsecstreetfighter/2010/08/17/thoughts-passwords/>>, the SANS Institute, Aug. 17, 2010, 3 pages.
Chazelle, et al., "The Bloomier Filter: An Efficient Data Structure for Static Support Lookup Tables," retrieved at <<http://www.eecs.harvard.edu/~michaelm/CS222/bloomier.pdf>>, Proceedings of the Fifteenth Annual ACM-SIAM Symposium on Discrete Algorithms, Jan. 2004, 10 pages.
Porat, Ely, "An Optimal Bloom Filter Replacement Based on Matrix Solving," retrieved at <<http://arxiv.org/PS_cache/arxiv/pdf/0804/0804.1845v1.pdf>>, Proceedings of the Fourth International Computer Science Symposium in Russia on Computer Science—Theory and Applications, Aug. 2009, 13 pages.
Zetter, Kim, "Weak Password Brings 'Happiness' to Twitter Hacker," retrieved at <<http://blog.wired.com/27bstroke6/2009/01/professed-twitt.html>>, Wired.com, Jan. 6, 2009, 5 pages.
Adams, et al., "Users Are Not the Enemy," retrieved at <<http://citeseerx.ist.psu.edu/viewdoc/download;jsessionid=AAC3D572D9E2A3B7E4EF4E8CB3694002?doi=10.1.1.23.6790&rep=rep1&type=pdf>>, Communications of the ACM, vol. 42, No. 12, Dec. 1999, pp. 40-46.
Bawa, et al., "Privacy-Preserving Indexing of Documents on the Network," retrieved at <<http://ftp.almaden.ibm.com/cs/projects/iis/hdb/Publications/papers/vldb03_ppi.pdf>>, Proceedings of the 29th International Conference on Very Large Data Bases, vol. 29, Sep. 2003, 12 pages.
Bloom, Burton H., "Space/Time Trade-offs in Hash Coding with Allowable Errors," retrieved at <<http://systems.cs.colorado.edu/grunwald/Classes/Fall2003-InformationStorage/Papers/p422-bloom.pdf>>, Communications of the ACM, vol. 13, No. 7, Jul. 1970, pp. 422-426.
Estan, et al., "New Directions in Traffic Measurement and Accounting: Focusing on the Elephants, Ignoring the Mice," retrieved at <<http://www.cs.ucy.ac.cy/courses/EPL606/papers/traffmeas.pdf>>, SIGCOMM'02, Aug. 2002, 14 pages.
Klein, Daniel V., "Foiling the Cracker: A Survey of, and Improvements to, Password Security," retrieved at <<http://www.homeworks.it/Pdf/Foiling%20the%20Cracker.pdf>>, Proceedings of the 2nd USENIX UNIX Security Workshop, 1990, 11 pages.
Norman, Don, "The Way I See It: When security Gets in the Way," retrieved at <<http://www.jnd.org/dn.mss/when_security_gets_in_the_way.html>>, Don Norman's jnd.org, Aug. 20, 2010, 6 pages.
Spafford, Eugene H., "Observing Reusable Password Choices," retrieved at <<http://reference.kfupm.edu.sa/content/o/b/observing_reusable_password_choices_63578.pdf>>, Purdue Technical Report CD-TR 92-049, Purdue University, Jul. 31, 1992, 14 pages.
Spafford, Eugene H., "OPUS: Preventing Weak Password Choices," retrieved at <<http://ftp9.freebsd.org/pub/papers/Everything/spaf-OPUS.pdf>>, Purdue Technical Report CD-TR 92-028, Purdue University, Jun. 1991, 12 pages.
Florencio, et al., "A Large-Scale Study of Web Password Habits," retrieved at <<http://lemur.ecs.soton.ac.uk/~cjg/www2007/cdrom/src/www2007.org/papers/paper620.pdf>>, Proceedings of the 16th International Conference on World Wide Web, May 2007, pp. 657-665.
Forget, et al., "Improving Text Passwords Through Persuasion," retrieved at <<https://www.ccsl.carleton.ca/paper-archive/forget-soups08.pdf>>, Proceedings of the 4th Symposium on Usable Privacy and Security, Jul. 2008, 12 pages.
Bergadano, et al., "Proactive Password Checking with Decision Trees," retrieved at <<http://www.di.unito.it/~ruffo/concorso/Papers/cccs97.pdf>>, Proceedings of the 4th ACM Conference on Computer and Communications Security, Apr. 1997, pp. 67-77.
Cormode, et al., "An Improved Data Stream Summary: The Count-Min Sketch and Its Applications," retrieved at <<http://www.madalgo.au.dk/img/SumSchoo2007_Lecture%20slides/Bibliography/p14_Cormode_JAI_05.pdf>>, Journal of Algorithms, vol. 55, Apr. 2005, pp. 58-75.
"Consumer Password Worst Practices," retrieved at <<http://www.imperva.com/docs/WP_Consumer_Password_Worst_Practices.pdf.>>, White Paper, Imperva, Redwood Shores, California, 2010, 5 pages.
Yan, Jeff, "A Note on Proactive Password Checking," retrieved at <<http://eref.uqu.edu.sa/files/a_note_on_proactive_password_checking.pdf>>, Proceedings of the 2001 Workshop on New Security Paradigms, Sep. 2001, 16 pages.
Clair, et al., "Password Exhaustion: Predicting the End of Password Usefulness," retrieved at <<http://www.enck.org/pubs/iciss06a.pdf>>, ICISS 2006, LNCS 4332, 2006, 19 pages.
Parekh, et al., "Privacy-Preserving Payload-Based Correlation for Accurate Malicious Traffic Detection," retrieved at <<http://sneakers.cs.columbia.edu/ids/publications/Isad.pdf>>, Proceedings of the 2006 SIGCOMM Workshop on Large-scale Attack Defense, Sep. 2006, 8 pages.
Oorschot, et al., "On Countering Online Dictionary Attacks with Login Histories and Humans-in-the-Loop," retrieved at <<http://people.scs.carleton.ca/~paulv/papers/tissec-aug06.pdf>>, ACM Transactions on Information and System Security, vol. 9, No. 3, Aug. 2006, pp. 235-258.
Pinkas, et al., "Securing Passwords Against Dictionary Attacks," retrieved at <<http://www.pinkas.net/PAPERS/pwdweb.pdf>>, Proceedings of the 9th ACM Conference on Computer and Communications Security, Nov. 2002, 14 pages.
Cohen, et al., "Spectral Bloom Filters," retrieved at <<http://wis.cs.ucla.edu/publications/papers/r09p02.pdf>>, Proceedings of the 2003 ACM SIGMOD International Conference on Management of Data, Jun. 2003, pp. 241-252.
Schechter, et al., "It's No Secret: Measuring the Security and Reliability of Authentication via 'Secret' Questions," retrieved at << http://citeseerx.ist.psu.edu/viewdoc/download;jsessionid=FD9A65BBA74685D8E85575BAF123AF52?doi=10.1.1.159.4656&rep=rep1&type=pdf>>, Proceedings of the 2009 30th IEEE Symposium on Security and Privacy, May 2009, 16 pages.
Schneier, Bruce, "MySpace Passwords Aren't So Dumb," retrieved at <<http://www.wired.com/politics/security/commentary/securitymatters/2006/12/72300>>, Wired.com, Dec. 14, 2006, 3 pages.
Manber, et al., "An Algorithm for Approximate Membership Checking with Application to Password Security," retrieved at <<http://brahe-if-a.mirrorservice.org/sites/ftp.webglimpse.net/pub/glimpse/password.pdf>>, University of Arizona, Jun. 1992, 10 pages.
Schechter, et al., "Popularity is everything: A new approach to protecting passwords from statistical-guessing attacks," retrieved at <<http://research.microsoft.com/apps/pubs/default.aspx?id=132859>>, 2010, 6 pages.

* cited by examiner

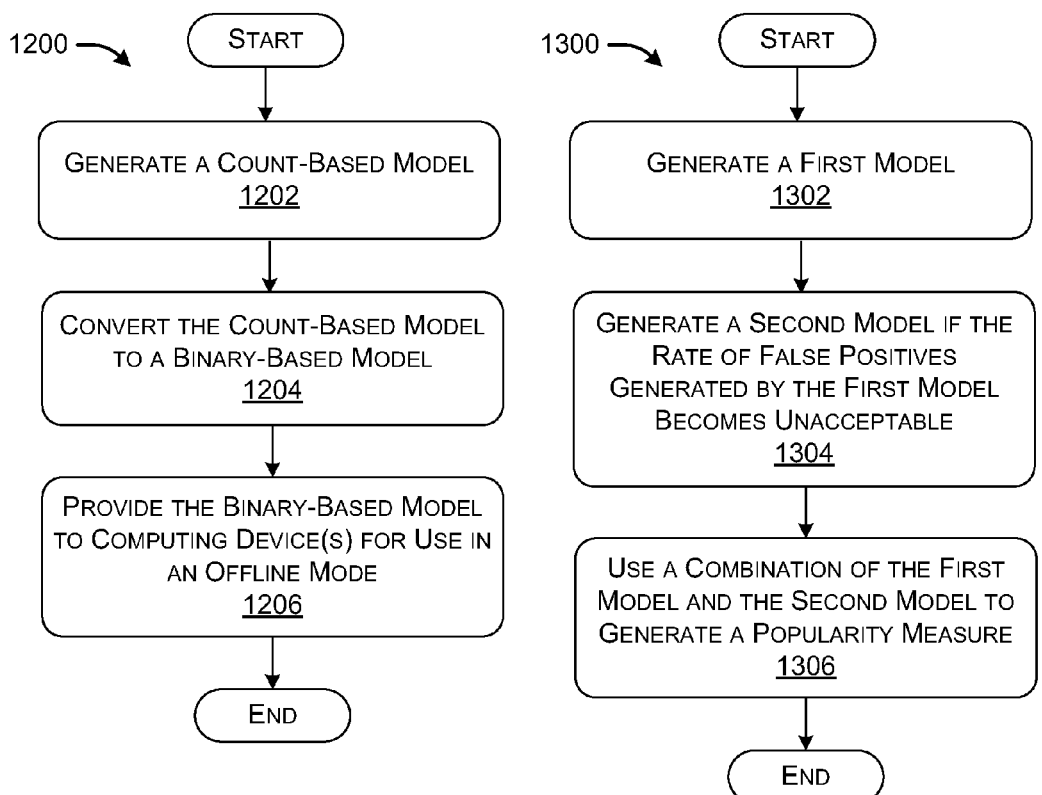

USE OF POPULARITY INFORMATION TO REDUCE RISK POSED BY GUESSING ATTACKS

BACKGROUND

A user may select a password for an online account with at least two objectives in mind. First, the user may attempt to select a password that is difficult for others to discover. Second, the user may attempt to select a password that is easy for the user to remember. However, the second objective may sometimes work against the first. Namely, in selecting a password that is easy to remember, the user may resort to a common password-selection strategy. This, in turn, may result in the selection of a password that is predictable to some extent. For instance, a user may choose a password which contains a personal name, a team name, a calendar date, one or more common dictionary words, and so on.

A malicious entity may attempt to take advantage of the above types of passwords by mounting a so-called statistical guessing attack. In such an attack, the malicious entity "guesses" a set of candidate passwords that may have been selected by some of the users. The malicious entity may draw from a variety of resources in guessing passwords, such as dictionaries, user data, known compromised passwords, statistical information, etc. The malicious entity may then successively submit these passwords to an online service. Through this process, the malicious entity may gain access to any account that is protected by a password included in the set of candidate passwords (assuming that the malicious entity also submits a correct username for that particular account). The malicious entity can then potentially cause harm to the owner of the account, e.g., by accessing and utilizing confidential information regarding the owner.

To address this type of threat, an online service may adopt various safeguards. These mechanisms generally attempt to steer a user away from the selection passwords that have textual characteristics that are deemed undesirable. For example, the online service may ask the user to comply with a set of rules that sets forth criteria of an acceptable password. Common rules may ask the user to enter a password that has a specified minimum length and/or contains certain types of characters. Alternatively, or in addition, the online service may provide a strength meter that measures the presumed strength of a selected password against a guessing attack. For example, such a meter may assess a selected password as strong, moderate, or weak.

However, these mechanisms are not fully satisfactory. First, these mechanisms may complicate the user's selection of a password to the annoyance of the user. For example, the user may dislike being asked to read and comply with written rules. The user may further dislike being asked to choose a password that is perceived as unduly complex and difficult to remember. Second, there is no guarantee that these mechanisms will actually decrease the predictability of a user's password in all cases. For example, the user may attempt to simplify a password as much as possible so that it can be easily remembered, while still complying with a stated password-selection policy. By adopting this approach, the user circumvents at least the spirit of the password-selection policy, increasing the risk that the selected password will be predictable.

For example, consider the case in which a user selects the password "P@$$word." On one hand, this password incorporates special characters that are not found in ordinary dictionary words. The password is unusual in this regard and may consequently be regarded as "strong" by a strength meter. On the other hand, the password adopts a somewhat common selection strategy of replacing letters of ordinary dictionary word with look-alike special characters. Therefore, this password may have occurred to many others, including a malicious entity which is attempting to duplicate the thought process of users, to the detriment of the users.

SUMMARY

Described herein is a popularity determination module (PDM) for use in reducing the risk of a guessing attack. The PDM operates by receiving a password (or other secret information item) from a user. The PDM then uses a model to determine popularity information based on the password. The popularity information indicates whether the password has been commonly selected among a group of users, and is therefore popular. If so, in one implementation, the PDM can invite or request the user to select another password. Otherwise, the PDM can accept the password. If appropriate, the PDM then updates count information in the model to reflect the receipt of the password.

The PDM thereby provides a direct approach to assessing the predictability of passwords and other secret information items, rather than (or in addition to) a circuitous policy-based or meter-based approach. That is, the PDM assesses a password as posing an unacceptable risk of prediction if it is actually popular among users, rather than (or in addition to) whether the password has proscribed textual characteristics. As such, the PDM allows a user to select any password he or she chooses, so long as that password has not been assessed as actually popular.

According to one illustrative implementation, the model used to generate the popularity information is a non-probabilistic model that generates non-probabilistic popularity information. That is, the non-probabilistic information provides an exact measure of a number of times that a password has been selected by a population of users.

According to another illustrative implementation, the model is a probabilistic model that generates probabilistic popularity information. The probabilistic popularity information provides an approximate estimate of the number of times that a password has been observed. For example, in one implementation, the probabilistic popularity information provides an upper bound on a possible number of times that a password has been observed. The password may have actually been observed a fewer number of times.

According to another illustrative implementation, the probabilistic model generates false positive indications of popularity. This means that the model determines that some passwords are popular when they are not, in fact, popular. More specifically, the probabilistic model is configured so that it generates false positives at a rate that exceeds a prescribed minimum rate. This characteristic impedes malicious attempts to determine which passwords are prohibitively popular, such as when a malicious entity generates passwords at random and tests them against the PDM.

According to another illustrative implementation, the probabilistic model corresponds to a count-min sketch model.

According to another illustrative implementation, in one case, updating of count values occurs beyond an integer popularity threshold d. This means that the PDM continues to count submitted passwords even if they have been assessed as unduly popular. According to another illustrative implementation, updating of count values is truncated at a counting limit that lies above the popularity threshold d.

The above approach can be manifested in various types of systems, components, methods, computer readable media, data structures, articles of manufacture, and so on.

This Summary is provided to introduce a non-exhaustive selection of features of the popularity determination module in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 12 shows an illustrative procedure for converting a count-based model (which provides count values) to a binary-based model (which provides yes/no indications of popularity).

FIG. 13 shows an illustrative procedure for producing and using a PDM that includes two component PDMs.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes illustrative popularity determination modules (PDMs) which directly assess the popularity of selected passwords and other secret information items. Section B describes illustrative methods which explain the operation of the PDMs of Section A. Section C describes illustrative processing functionality that can be used to implement any aspect of the features described in Sections A and B.

Figure 15:
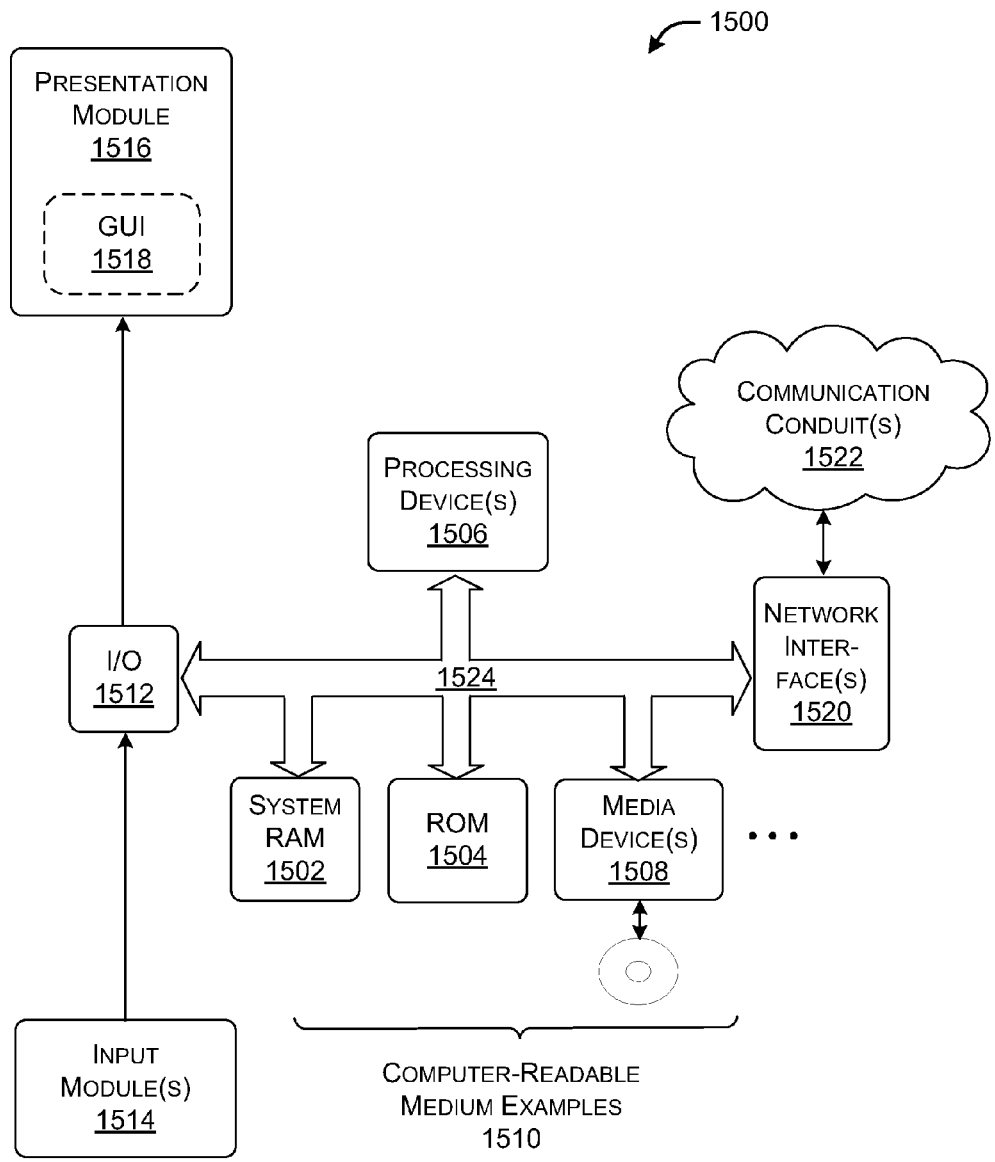
FIG. 15 shows illustrative processing functionality that can be used to implement any aspect of the features shown in the foregoing drawings.

As a preliminary matter, some of the figures describe concepts in the context of one or more structural components, variously referred to as functionality, modules, features, elements, etc. The various components shown in the figures can be implemented in any manner. In one case, the illustrated separation of various components in the figures into distinct units may reflect the use of corresponding distinct components in an actual implementation. Alternatively, or in addition, any single component illustrated in the figures may be implemented by plural actual components. Alternatively, or in addition, the depiction of any two or more separate components in the figures may reflect different functions performed by a single actual component. FIG. 15, to be discussed in turn, provides additional details regarding one illustrative implementation of the functions shown in the figures.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). The blocks shown in the flowcharts can be implemented in any manner.

The following explanation may identify one or more features as "optional." This type of statement is not to be interpreted as an exhaustive indication of features that may be considered optional; that is, other features can be considered as optional, although not expressly identified in the text. Similarly, the explanation may indicate that one or more features can be implemented in the plural (that is, by providing more than one of the features). This statement is not be interpreted as an exhaustive indication of features that can be duplicated. Finally, the terms "exemplary" or "illustrative" refer to one implementation among potentially many implementations.

A. Illustrative Popularity Determination Modules

Figure 1:
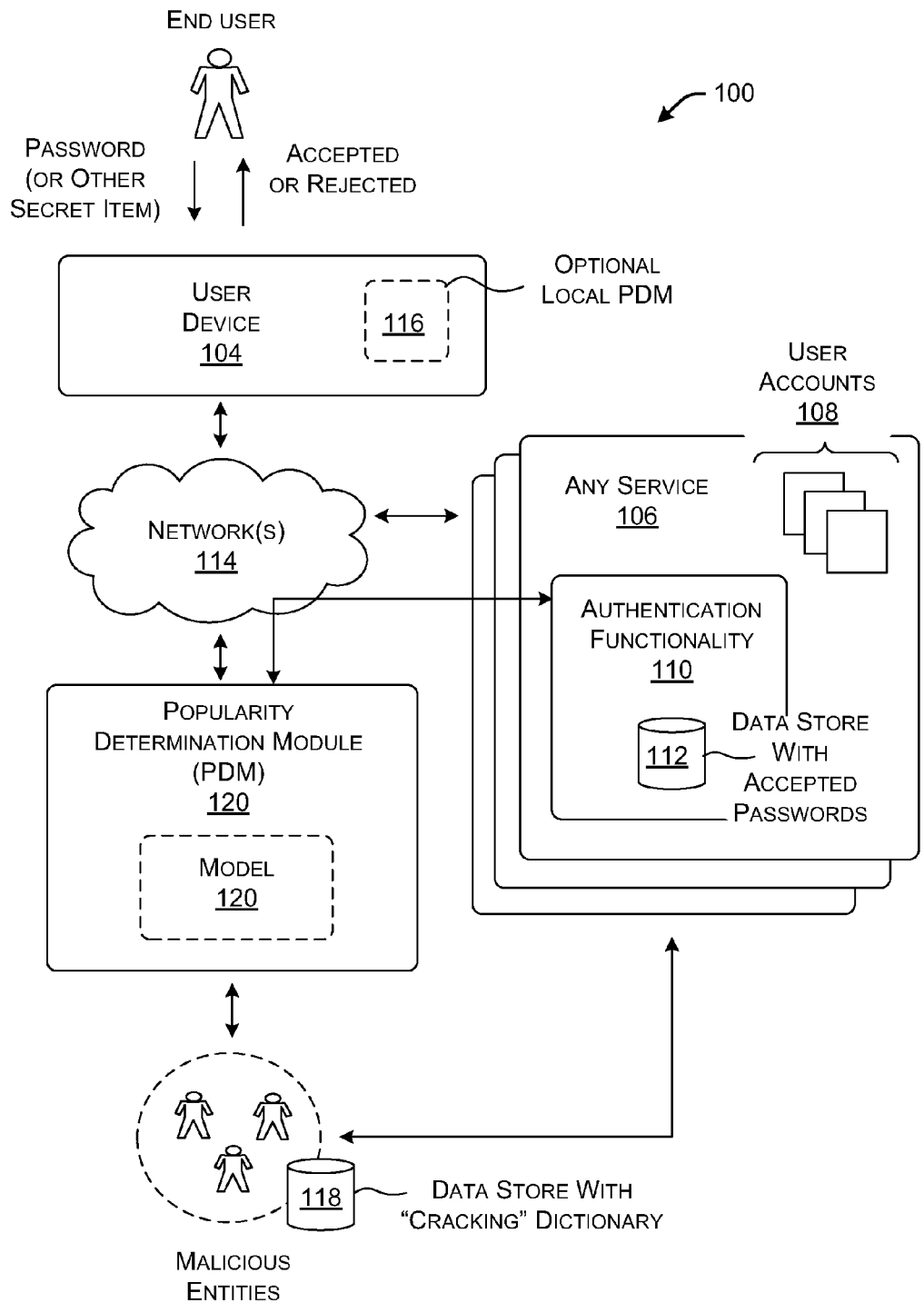
FIG. 1 shows an illustrative environment that uses a popularity determination module (PDM) to reduce the risk of statistical guessing attacks.

FIG. 1 shows an environment 100 in which a popularity determination module (PDM) 102 functions to reduce the risk posed by guessing attacks. Before describing the operation of the PDM 102, this section introduces the principal components of the environment 100.

In one implementation, any end user (or just "user") operates a user device 104 to interact with any service 106, e.g., by submitting a network address associated with the service 106. The service 106 may correspond to one service among a plurality of possible services with which the user interacts. To cite merely a few examples, the service 106 may correspond to an online Email service, an instant messaging (IM) service, a social networking service, a shopping service, a financial service, and so on.

The service 106 may host a plurality of user accounts 108, one of which may be associated with the user. In an initial registration process, the service 106 may request the user to select a username and password, together with possible other personal information items. Following registration, the service 106 permits the user to access his or her account upon entry of a correct username and password.

More specifically, the service 106 may include authentication functionality 110 which governs access to accounts. The authentication functionality 110 may store the user's password in a data store 112, along with the passwords of other users. When the user submits a password (and username), the authentication functionality 110 determines whether the submitted password corresponds to the password associated with the user's account, as stored in the data store 112. If there is a match between the submitted password and the appropriate password in the data store 112 (for the account), the authentication functionality 110 allows the user to access his or her account.

As to physical implementation, the user device 104 can correspond to any type of computing device. For example, the user device 104 can be implemented by a personal computer, a workstation, a laptop computer, a mobile phone device, a personal digital assistant, a tablet-type device, a game console device, a set-top box device, and so on.

The service 106 can be implemented by one or more server computing devices of any type(s), one or more data stores, routing functionality, and so on. This service-related equipment can be implemented at a single site, or by equipment distributed over plural sites.

In one implementation, the user device 104 may interact with the service 106 via one or more networks 114 of any type (referred to below in the singular for ease of reference). For example, the network 114 may represent a wide area network (e.g., the Internet), a local area network, a telecommunications network, or any combination thereof. The network 114 can be implemented by any combination of wireless links, hardwired links, routing functionality, name servers, gateways, etc. The network 114 can operate using any protocol or combination of protocols.

In one case, the PDM 102 represents functionality that can be integrated into the authentication functionality of one or more services. That is, in one case, each service can incorporate its own instance of the PDM 102. In another case, the PDM 102 represents stand-alone functionality. In that case, the authentication functionality of any service may interact with a common PDM 102, e.g., by accessing the PDM 102 over the network 114. In yet a third case, part of the PDM 102 can be implemented by the authentication functionality of one or more services, and part of the PDM 102 can be implemented as stand-alone functionality. In any of these scenarios, the PDM 102 can be implemented by one or more computing devices, one or more data stores, routing equipment, and so on.

In addition, or alternatively, each user device 104 can incorporate a local PDM 116. The user device 104 can interact with the local PDM 116 without accessing a remote PDM via the network 114. In other words, the local PDM 116 can operate in an offline mode. The following description will set forth one way that the local PDM 116 can be configured to provide its services in the offline mode. In one example, for instance, the user device 104 may represent a kiosk or the like which is not connected to the network 114, or which is not always connected to the network 114.

The end user shown in FIG. 1 represents a non-malicious entity that accesses the online service 106 to perform a legitimate and authorized operation. Other entities that may interact with the environment 100 represent malicious entities. These entities are malicious insofar their objectives run counter to the interests of the non-malicious users. For example, the malicious entities may attempt to access secret information associated with the legitimate end users.

One way that a malicious entity may attempt to steal information is via a statistical guessing attack. In such an attack, the malicious entity generates a set of candidate passwords. These candidate passwords represent "guesses" at the actual passwords selected by the users. The malicious entity can draw from a number of resources to perform this task. For example, the malicious entity can draw from compromised passwords that have been publically released (with or without the authorization of users), compromised passwords from previous attacks, conventional dictionary resources, personal data pertaining to the users, statistical information regarding common selection strategies, and so on. The malicious entity can store the set of candidate passwords as a "cracking" dictionary in a data store 118. Some candidate passwords may be more successful than others in gaining access to user accounts. If the malicious entity can formulate some metric (or metrics) of predicted success, the malicious entity can order the passwords in the cracking dictionary by likelihood of success.

The malicious entity can then submit the passwords to an online service 106. More specifically, the malicious entity may submit the passwords in order of predicted success, e.g., by first submitting the passwords that are presumed to be most likely to gain access to user accounts. In mounting this attack, the malicious entity potentially may have access to a large number of IP addresses to limit the efficacy of IP-based lockout mechanisms. Further, the malicious entity potentially may have access to a large number of valid usernames. In one attack strategy, the malicious entity may successively submit a username along with different candidate passwords that are presumed to be popular, hoping that one pairing (of username and password) will gain access to a user's account.

Assume that a subset of candidate passwords provides unauthorized access to some of the user accounts 108. Once granted access, the malicious entity can access confidential information associated with the accounts. This can potentially cause great harm to the rightful owners of the compromised accounts.

The PDM 102 provides a service designed to reduce the effectiveness of the above-described type of guessing attack. In the illustrative context set forth above, the PDM 102 is particularly aimed at preventing malicious entities from successfully guessing user passwords. But the PDM 102 can also be used to thwart an attempt to obtain other types of secret information items. For example, the PDM 102 can be used to prevent a malicious entity from successfully guessing secret questions (and/or corresponding secret answers to those questions), commonly referred to in the art as "security questions" or "challenge questions." A security question and/or answer thereto represents a secret information item. That is, the authorization functionality 110 of the service 106 may ask the user to choose a security question and a corresponding answer; this confidential information can be used by the user to gain access to the user's account when the user has forgotten his or her password. The term "secret information item" may correspond to yet other types of confidential information. However, to simplify the explanation, the following description will describe the operation of the PDM 102 in the context in which the secret information items represent passwords.

In brief, the PDM 102 maintains count information which reflects the observed popularity of different passwords selected by a population of users. More specifically, the count information for a password may indicate how many times that particular password has been selected by other users. In operation, the user submits a password, e.g., in the course of selecting a password during a registration process. The PDM 102 uses the password to retrieve count information associated with that password. In a first scenario, the count information indicates that the submitted password is below a popularity threshold (to be described below). In that case, the PDM 102 accepts the password. In a second scenario, the count information indicates that the password exceeds the threshold popularity. In that case, the PDM 102 may ask the user to select another password.

In an alternative case, the PDM 102 may initially indicate that a user's password is suitably unpopular, but the password then becomes popular because other people have selected it. The PDM 102 can address this scenario by notifying the user that his or her password has become popular. The PDM 102 can then invite (or request) the user change his or her password. Generally, the term "popular" or the like is sometimes used herein as a shorthand reference to describe items that are assessed as unacceptably or unduly popular (based on any criterion or criteria). Further, a password is sometimes said to be not popular when it has been assessed as being suitably unpopular (based on any criterion or criteria).

In performing the above tasks, the PDM 102 can dispense with the use of written policy guidelines and password strength meters. Instead, the PDM 102 makes a direct determination of whether the password submitted by the user has been previously selected by too many users, and is therefore dangerously popular—and therefore potentially dangerously predictable. The elimination of common passwords reduces the effectiveness of a statistical guessing attack because it removes matches for the most popular entries in the cracking dictionary.

Furthermore, the PDM 102 may provide satisfactory user experience. The user is set free to choose any password, so long as that password is not actually popular among other users. That is, the user does not need to read, understand, and apply written policy guidelines. Nor does the user need to deal with policy criteria automatically imposed by a password strength meter. However, in other implementations, the PDM 102 can be combined with other safeguards, such as written policy guidelines, password strength meters, CAPTCHA mechanisms, guess-limiting mechanisms, and so on, or any combination thereof. A guess-limiting mechanism limits the number of times that an entity may submit an incorrect password when attempting to gain access to his or her account within a specified span of time before being precluded from submitting further guesses.

The following description sets forth different implementations of the PDM 102. In general, the PDM 102 can include functionality which implements a model 120. The model 120 represents the theoretical paradigm used by the PDM 102. In a first general case, the model 120 may use a non-probabilistic paradigm. A non-probabilistic model provides an exact indication of whether each submitted password is or is not popular. In a second general case, the model 120 may use a probabilistic paradigm. A probabilistic model provides only a probabilistic indication of whether each submitted password is popular.

In one case, for example, a probabilistic model provides, for each password, an upper bound on the number of times that that password has been observed by the PDM 102. For example, assume that the probabilistic model indicates that a certain password has been selected by 100 users. The probabilistic model can guarantee that the actual number of times that the password has been observed is no greater than 100. But it cannot guarantee that all purported instances of the password have actually been observed. Some of the purported instances may correspond to false positives. For a false positive, the probabilistic model indicates that an instance of a password has been selected by a user, when it fact it has not. A "false positive rate" refers to a rate at which false positives occur.

Other probabilistic models can be used that have other respective characteristics. For example, another type of probabilistic model can generate an approximate estimate of the actual number of times that a password has been observed, e.g., without providing upper bound guarantees. Such a model may generate false positives as well as false negatives. A false negative occurs when the PDM 102 determines that a password is suitably unpopular, when, in fact, it is unacceptably popular. However, to facilitate explanation, the remaining explanation will be framed in the context of the probabilistic models that provide an upper bound guarantee.

The PDM 102 can be configured with at least two goals in mind. First, the PDM 102 is configured to limit the false positive rate so that it is not too high (because a high rate will unnecessarily frustrate users). Second, the PDM 102 is configured to limit the false positive rate so that it at least exceeds a lower rate threshold. As will be described in greater detail below, this second goal is useful to help reduce the efficacy of attempts to filter unpopular passwords out of an original set of candidate passwords to provide a refined set of passwords (where that refined set of passwords can then be used to mount a guessing attack).

Figure 2:
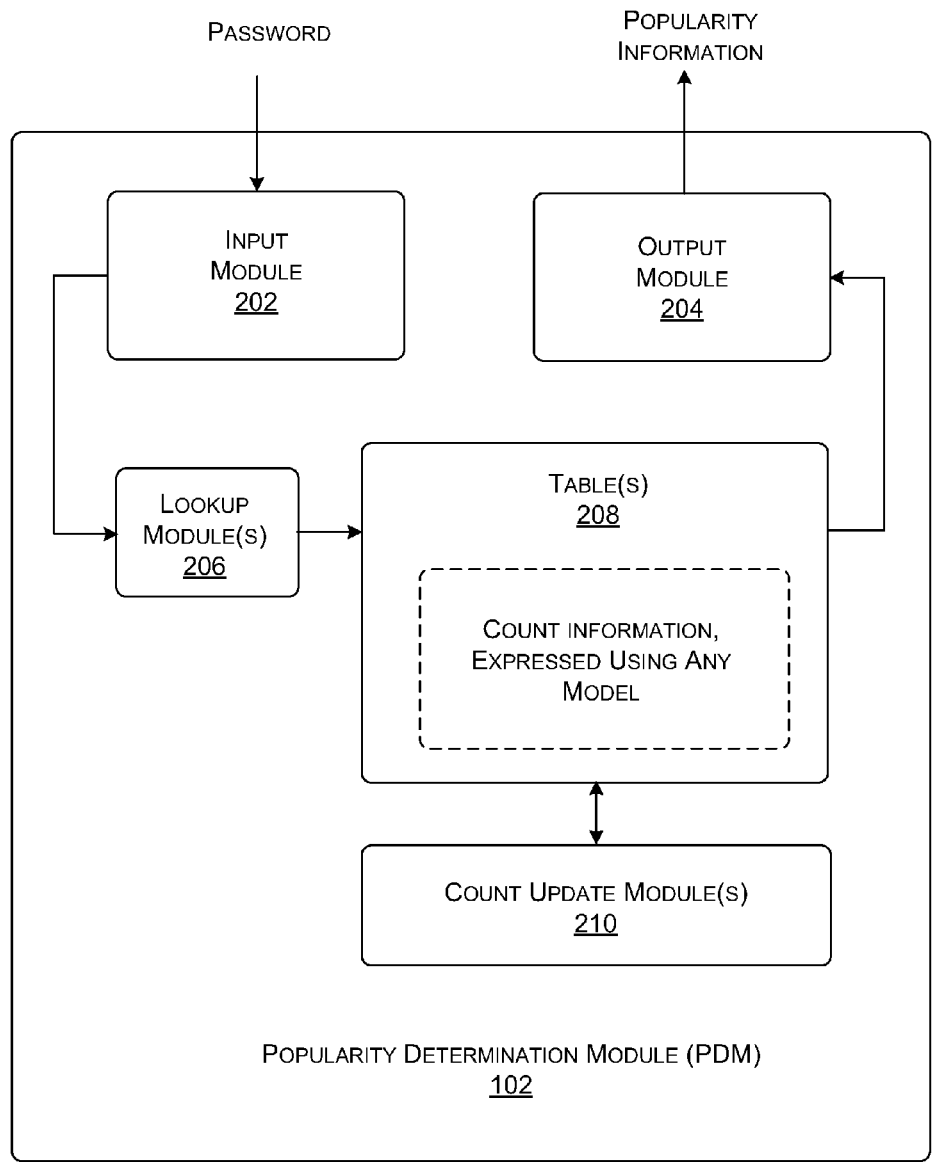
FIG. 2 shows one illustrative implementation of the PDM of FIG. 1.
Figure 3:
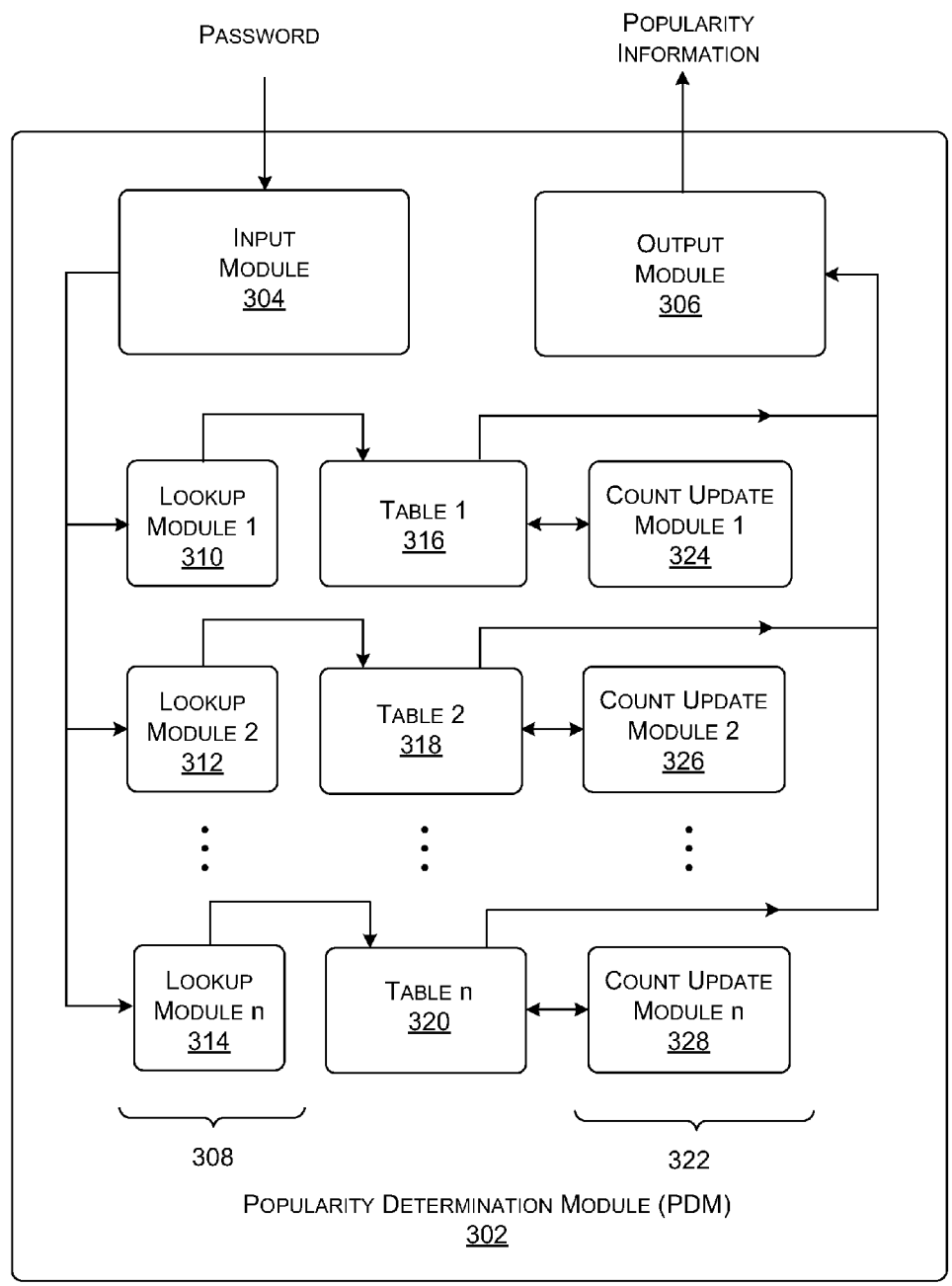
FIG. 3 shows a more specific implementation of the PDM of FIG. 2. The PDM of this figure implements a count-min sketch model.

Advancing to FIG. 2, this figure shows an overview of one implementation of the PDM 102. FIG. 3 will set forth a yet more specific instantiation of the general framework shown in FIG. 2.

The PDM 102 includes an input module 202 for receiving a password (or any other secret information item). As noted above, the PDM 102 can receive the password in response the user's selection of the password in a registration process. But it is also possible to examine the current popularity of a password that has already been selected and accepted. The PDM 102 also includes an output module 204 for outputting popularity information. As used herein, popularity information refers to any information which represents the popularity of the password. For example, the popularity information may correspond to a binary indication of whether or not the password has been assessed as popular (e.g., based on whether or not the count information identified by the PDM 102 exceeds a threshold, to be described below). In another case, the popularity information can correspond to a variable indication of an extent of popularity.

A lookup module 206 performs the task of mapping the password to one or more locations in one or more tables 208 (referred to in the singular below for brevity). For example, in one case, the lookup module 206 may correspond to one or more hashing functions which operate on the password to produce one or more hashes. The one or more hashes serve as location addresses which point to one or more locations in the table 208. Either complete or truncated hashes can be used to point to location addresses. A truncated hash is produced by removing some of the information provided by a complete hash.

The table 208 can be implemented as a data structure that stores count information. The count information, in turn, corresponds to a plurality of count values. For a non-probabilistic model, for example, the table 208 can provide a count value for each previously-observed password. The count value for a password indicates exactly how many times that the password has been received by the PDM 102, which corresponds to how many times different users have selected this password. In another case, the table 208 can provide a plurality of count values for each previously-encountered password. The output module 204 can reconstruct a probabilistic indication of how many times the password has been received based on the plurality of count values associated with that password. Additional information regarding the latter (probabilistic) scenario is provided below.

A count update module 210 updates the table 208 upon receipt of each received password, if appropriate. For example, in the case in which each password correlates to a single non-probabilistic count value, the count update module 210 can increment that single count value. In the case in which each password corresponds to plural count values, the count update module 210 can update one or more of these count values. In certain implementations, the count update module 210 can also be used to decrement count values. For example, if a user relinquishes or abandons a password, the PDM 102 can decrement the count information associated with this password. Again, the following description provides additional information regarding the manner of operation of the count update module 210.

FIG. 3 shows a PDM 302 which is a particular instantiation of the general PDM 102 of FIG. 2. More specifically, the PDM 302 of FIG. 3 embodies a count-min sketch type of model. The count-min sketch model is a probabilistic model having the properties described above. Namely, as applied herein, the count-min sketch model probabilistically identifies a number of times that a password has been observed, where that number represents an upper bound on an actual number of times that the password has been observed. This means that the count-min sketch model occasionally indicates that a certain password has been observed, when it has not. Again, this description refers to such an event as a false positive.

The PDM 302 includes an input module 304 for receiving a password (or other secret information item). The PDM 302 also includes an output module 306 for generating popularity information. Again, the popularity information may indicate whether or not count information associated with a received password exceeds a prescribed threshold, and is therefore deemed popular.

The PDM 302 also includes a lookup module 308 that comprises a plurality of component lookup modules (310, 312, . . . 314). The PDM 302 also includes a plurality of corresponding tables (316, 318, 320). Each lookup module maps the received password to a particular location in a corresponding table. For example, the lookup module 1 (310) maps the password to a location in table 1 (316). The lookup module 2 (312) maps the password to a location in table 2 (318). And the lookup module n (314) maps the password to a location in table n (320). In one implementation, the lookup modules (310, 312, 314) correspond to different hash functions which perform the above-described mapping operation. That is, the hash functions provide hashes which function as location addresses pointing to locations in the tables (316, 318, 320).

For a particular password, the identified locations in the tables (316, 318, . . . 320) provide a plurality of count values. The output module 306 operates by selecting the minimum of these count values. The output module 306 uses this minimum value as an indication of the number of times that the password has been previously observed. Again, the PDM 302 operates using a probabilistic model, so that, in one implementation, the minimum count value represents an upper bound of an actual number of times that the password has been observed.

The PDM 302 also includes a count update module 322 that includes plural component count update modules (324, 326, . . . 328). Each count update module updates the identified count value in a corresponding table to reflect that the password that has been received. For example, the count update module 1 (324) increments the identified count value in table 1 (316). The count update module 2 (326) updates the identified count value in table 2 (318). And the count update module n (328) updates the identified count value in table 3 (320). As will be described shortly, the PDM 302 can modify this updating behavior in various ways to achieve different objectives.

FIG. 3 represents only one implementation of a PDM that can be used in the environment of FIG. 1. In another case, a PDM can use a counting bloom filter model. A counting bloom filter model employs a plurality of hash function which map a submitted password to plural locations in a single table (instead of plural tables, as described above in the count-min sketch context of FIG. 3). The counting bloom filter model is a probabilistic model having the properties described above.

Figure 4:
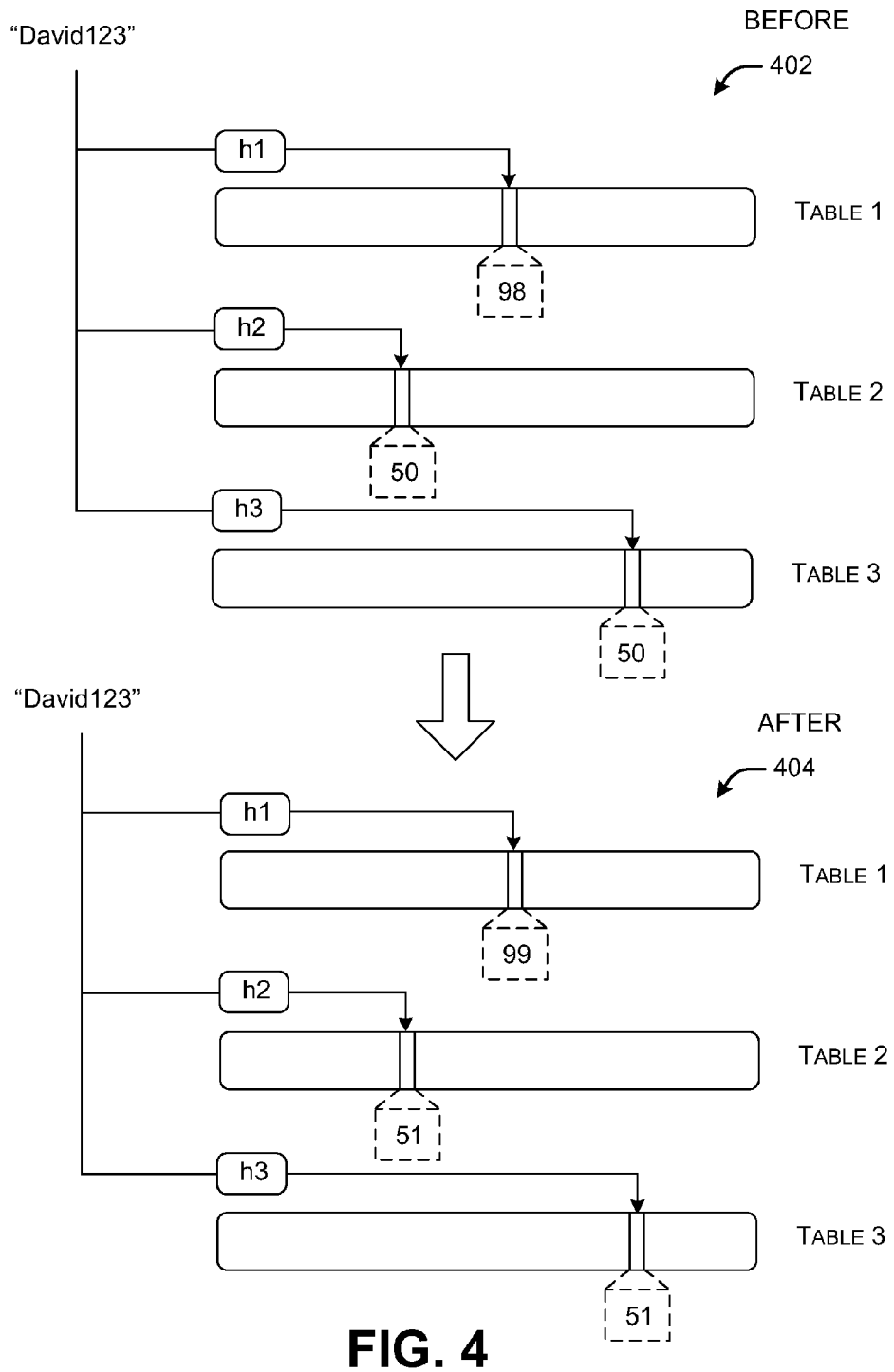
FIG. 4 shows an example of an updating operation performed by the PDM of FIG. 3.

FIG. 4 shows an example which demonstrates the manner of operation of the PDM 302 of FIG. 3 upon receipt of the hypothetical password "David123." This password does not embody a great deal of originality. It may therefore be common. The top half 402 of FIG. 4 shows the state of the model before the password is received. The bottom half 404 of the FIG. 4 shows the state of the model after the password is received.

In the "before" state, assume that the PDM 302 includes a first hash function (h1) which maps the password ("David123") to an identified location in table 1 that contains the count value 98. A second hash function (h2) maps the password to an identified location in table 2 that contains the value 50. A third hash function (h3) maps the password to an identified location in table 3 that also contains the value 50. In this situation, the output module 204 can indicate that the representative count value is 50, since this value represents the minimum of the three values. (In another implementation, the output module 204 can take the minimum of the count values after the updating has been performed, described below).

In the "after" state, the count update module 322 updates each of the count values at the identified locations in the three tables. Namely, the count update module 322 updates the count value 98 in table 1 to 99, updates the count value 50 in table 2 to 51, and updates the count value 50 in table 3 to 51. In an alternative implementation, the count update module 322 can perform a conservative add operation. In this operation, the count update module 322 only updates the minimum count value (or plural minimum count values if there are more than one). For example, the count update module 322 can update the count values of 50 to 51, but not the count value of 98 to 99. This provision is useful to reduce the number of false positives generated by the PDM 302.

Having identified the minimum count value, the output module 306 proceeds to determine whether that count value supports a conclusion that the password is popular. The output module 306 can perform this operation by comparing the minimum count value with a threshold. If the minimum count value is above the threshold, the output module 306 generates popularity information which indicates that the password is popular. Otherwise, the output module 306 generates output information which indicates that the password is not sufficiently popular.

Figure 5:
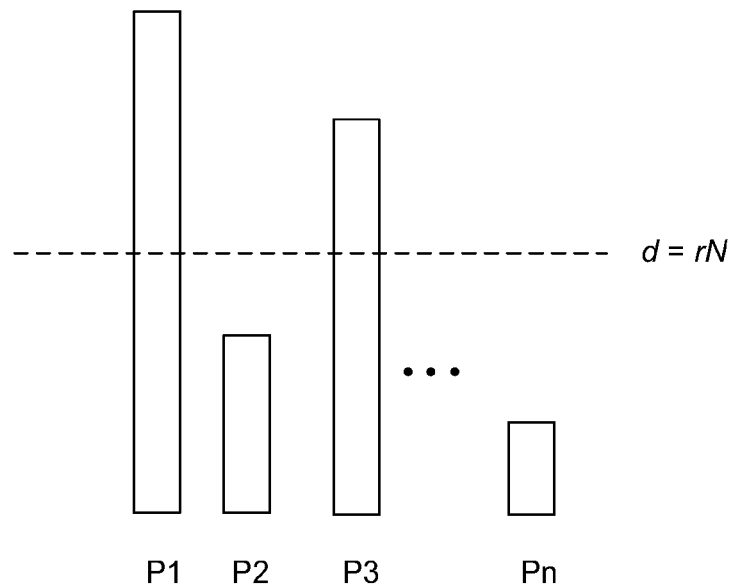
FIG. 5 shows a first implementation of an updating operation, corresponding to the example shown in FIG. 4.

FIG. 5 shows one implementation of the above-described threshold comparison operation. In this scenario, assume that the PDM 302 has observed at least passwords P1, P2, P3, . . . and Pn. Further assume that, in a current state, the PDM 302 identifies upper-bound count values for the passwords P1, P2, P3, . . . and Pn. Each upper-bound count value corresponds to a respective minimum count value which is determined in the manner described above. The heights of the bars shown in FIG. 5 represent the respective minimum count values.

The output module 306 determines that any password is popular if its minimum count value exceeds an integer popularity threshold d. That threshold, in turn, can be expressed as a fractional popularity threshold (r) multiplied by a total number (N) of password instances that have been observed (e.g., corresponding to a total number of passwords that have been selected, either successfully or unsuccessfully, by users for their respective accounts). That is, in one contextual setting, N represents the number of passwords selected, either successfully or unsuccessfully, by users, and hence the number of passwords received and counted by the PDM 302. The integer popularity threshold grows with the number (N) of observations.

Alternatively, or in addition, the PDM 302 (or any PDM) can apply an absolute popularity threshold which does not grow with the number of observations N. For example, the PDM 302 can assess a password as unduly popular if it has been used in x number of accounts. The PDM 302 can also adjust this threshold based on various contextual factors.

In the example of FIG. 5, upon receiving a new instance of a particular password, the count update module 322 increments at least the minimum count value associated with the password. While the count information produced thereby is expressive, it also has a downside. Assume that a malicious entity obtains a copy of the count information expressed in the PDM 302. If so, the malicious entity can use the count information to rank the popularity of the passwords, and thereby identify a subset of the most popular passwords. The entity can then mount a guessing attack which targets the most popular passwords. For example, the entity may direct such an attack against a service which does not rely on the PDM 302.

Figure 6:
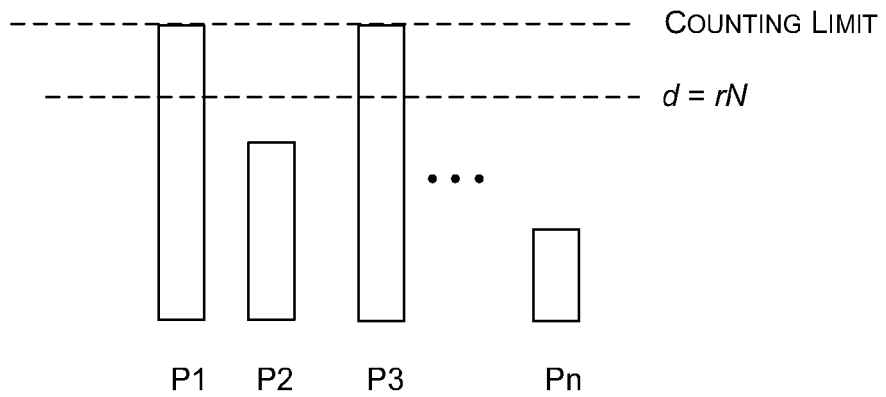
FIG. 6 shows a second implementation of an updating operation in which count values are constrained by a counting limit.

FIG. 6 shows a variation of the PDM 302 which reduces the effectiveness of such an attack. Namely, in the case of FIG. 6, the count update module 322 stops incrementing count values beyond a counting limit. For example, the counting limit may correspond to a prescribed offset above the incremental threshold popularity (d). Since the incremental threshold popularity (d) increases with increasing observations (N), so does the counting limit. In this approach, a malicious entity that obtains a copy of the PDM 302 can learn the set of passwords that have been assessed as popular, corresponding to the set of count values which exceed the integer popularity threshold. Yet the malicious entity will be unable to rank the popularity of passwords within that set (because the corresponding count values are all truncated at the counting limit). In one implementation, for the counting limit scenario of FIG. 6, the PDM 302 increments N each time a user attempts to select a password for an account, whether or not this leads to updating of the count information. In another implementation, the PDM 302 increments N only when the count update module 322 is called upon to update the count information.

The count update module 322 sets the counting limit an offset amount above the integer popularity threshold (d) to produce a stable assessment of popularity. That is, assume that, in the alternative, the counting limit is set at the integer popularity threshold. As observations are received, due to statistical variation in the submission of passwords, the popularity level for a popular password can potentially temporarily fall below the integer popularity threshold d, even though the password actually remains unduly popular. Setting the counting limit a suitable amount above the integer popularity threshold removes this phenomenon and ensures that a password that is properly assessed as popular (and which remains popular) is not accepted.

More specifically, assume that the count level of a particular password, e.g., "David123," reaches the integer popularity threshold d, and is therefore assessed as undesirably popular at this point in time. The PDM 302 will prevent any user from successfully registering the password "David123" past the integer popularity threshold d. Note that, if the counting limit is greater than d, the PDM 302 will continue to count occurrences of the password "David123" above the value d. Over time, as the total number of recorded passwords grows, the integer popularity threshold likewise grows (e.g., if d=r*N, as indicated above). By the time d is incremented due to the increased total number of passwords, the counted occurrences of "David123" may already exceed the new, larger, value of d. For example, assume that the counting limit is greater than d and that users continue to attempt to select the password "David123" at a rate indicative of the continued popularity of this password. In this case, no more accounts may be permitted to use the popular password "David123," even though the fraction of users with this password decreases with each new account. Viewed in a more general context, this example is an illustration that, in any implementation, the count values stored by a PDM need not (necessarily) equate to the number of accounts that are permitted to use corresponding passwords.

In both the examples of FIGS. 5 and 6, assume that a password is appropriately assessed as unduly popular based on observations formed in time interval defined by the time instances 1 to β. In one case, the password may remain popular following the time instance β. But in another case, there is a possibility that people stop attempting to submit the password, causing it to decrease in popularity (when viewed in the context of all passwords N that have been submitted).

The PDM 102 can address these aging considerations in different ways, according to different respective implementations. In one case, the PDM 102 can change the status of a password that decreases in popularity, so that it is no longer classified as unduly popular. In another case, the PDM 102 can permanently prohibit a password whenever it has been assessed as popular, or whenever the password remains popular for a prescribed amount of time, etc. Still other variations are possible; for example, the PDM 102 can apply weights to count values which increase as a function of time, which act to decrease the count values as a function of time, and so on.

Figure 7:
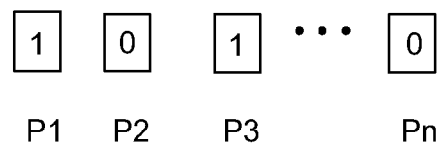
FIG. 7 shows a manner of representing count values using binary values.

FIG. 7 shows a still more simplified manner of representing count values associated with passwords. In this case, the PDM 102 stores a binary yes/no value in the place of each count value. The binary value indicates whether the corresponding count value exceeds a prescribed threshold. For example, the minimum count values for passwords P1 and P3 are assigned a first binary value, i.e., 1. The minimum count values for passwords P2 and Pn are assigned a second binary value, i.e., 0. In operation, a password that is popular will map to a set of values that are all assigned the value 1. A password that is not popular will map to a set of values that includes at least one value that is assigned the value 0.

According to one manner of use, a centralized PDM module (e.g., corresponding to the type of PDM 102 shown in FIG. 1) can convert a count-based model (associated with the full count values shown in FIG. 5) to a binary-based model (associated with the binary count values shown in FIG. 7). The centralized PDM module can then distribute the binary-based model to appropriate local computing devices. FIG. 1 shows one such local PDM 116 installed on the user device 104. The user device 104 can consult the local PDM 116 without accessing the network 114. The centralized PDM can continue to update count values in the count-based model. Periodically, or in response to other triggering events, the centralized PDM can compute an updated binary-based PDM and send that PDM to the local computing devices.

Figure 8:
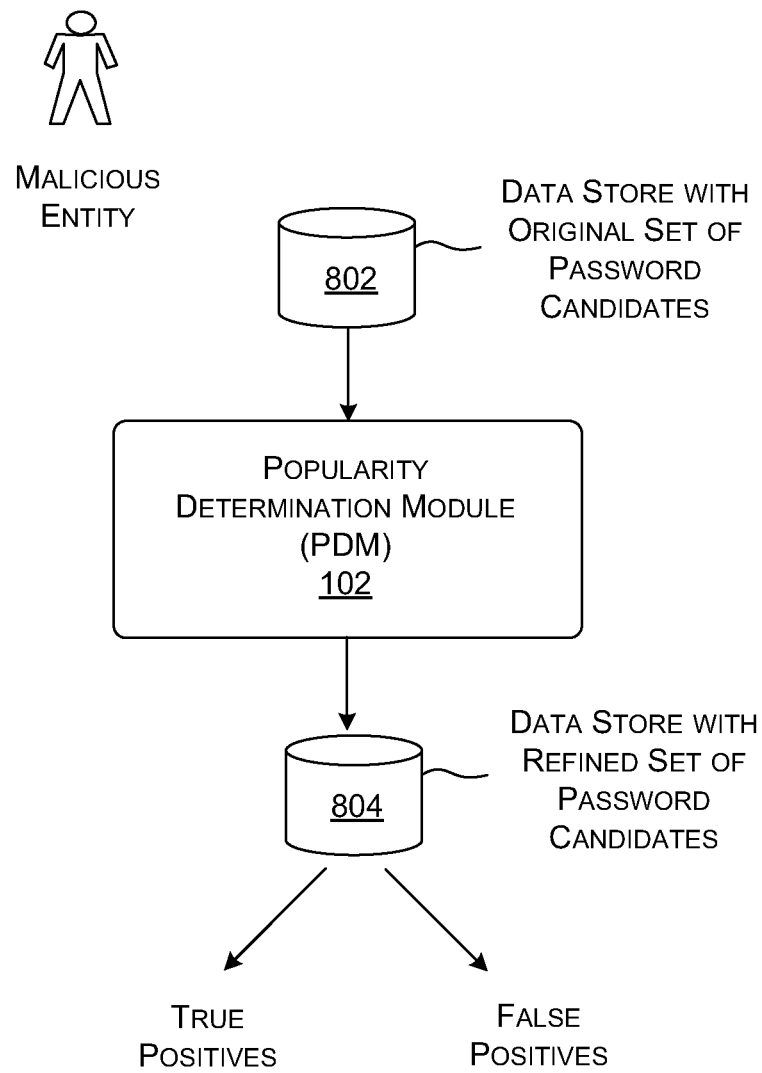
FIG. 8 is an illustration that serves as a vehicle for describing the manner in which the PDM of FIG. 1 generates false positives, and for describing the usefulness thereof in repelling guessing attacks.

FIG. 8 is a graphical illustration that that conveys the manner in which false positives may reduce the risk of a statistical guessing attack. In such an attack, assume that the malicious entity has access to the PDM 102 of FIG. 1. For example, either the malicious entity can query an online version of the PDM 102, or the malicious entity has a copy of the PDM 102 itself. Further assume that the malicious entity has generated (or otherwise has access to) an original set of candidate passwords, provided in a data store 802. The original set of candidate passwords may correspond to a relatively large number of passwords.

The malicious entity can then use the PDM 102 to identify a subset of popular passwords within the original candidate set of passwords. This produces a refined set of candidate passwords, stored in data store 804. The malicious entity may then submit the refined set of popular passwords to an online service, attempting to gain unauthorized access to the accounts which use any of the identified popular passwords in the refined set. In other words, the malicious entity uses the PDM 102 to identify the passwords in the original set that are most likely to successfully provide access to user accounts.

However, as noted above, a probabilistic implementation of the PDM 102 is specifically tuned to provide false positives at a prescribed minimum rate. The rate of false positives limits the extent to which the malicious entity can refine the original set of passwords. For example, assume that the PDM 102 provides one false positive for every 100 passwords that it observes. This means that the malicious entity can only refine the original set of passwords by a factor of 100. For example, assume that there are one billion original passwords in the original set of passwords. The malicious entity can use the PDM 102 to reduce that initial set to only 10 million. There may, in fact, be a much smaller core of truly popular passwords in the refined set of 10 million.

Figure 9:
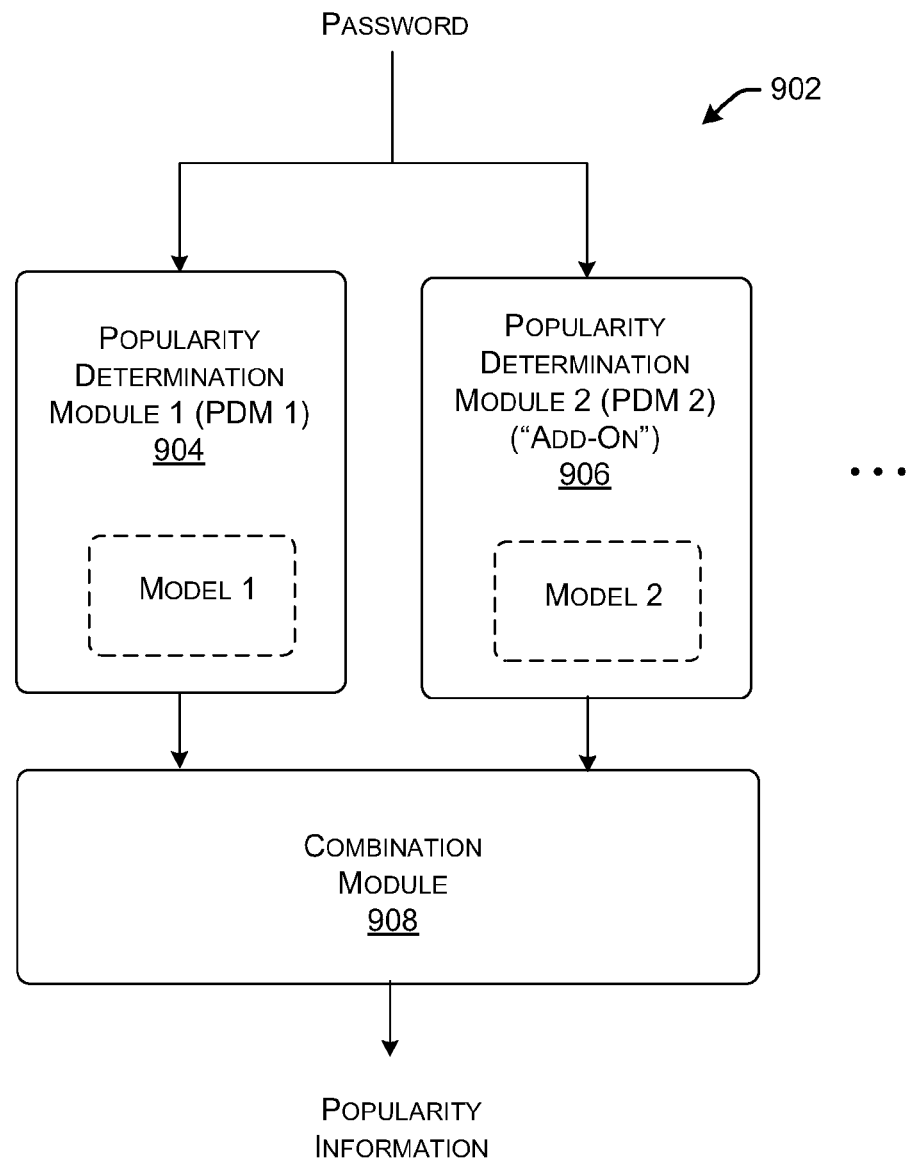
FIG. 9 shows an implementation of the PDM that includes two component PDMs.

FIG. 9 shows a PDM 902 that includes two component PDMs (904, 906). For each input password, the first component PDM 904 produces a first assessment of whether the password is popular. The second component PDM 906 produces a second assessment of whether the password is popular. A combination module 908 then combines the popularity information generated by the two component PDMs (904, 906) to provide a final indication of popularity. For example, the combination module 908 can be configured to indicate that the password is popular only when both component PDMs (904, 906) assess it as popular.

The PDM 902 may be useful in different scenarios. In one case, an administrator may generate the first component PDM 904 to yield a desired false positive rate a. (In the following description, an "administrator" refers to any individual or agent that is entrusted to generate and maintain a PDM.) The administrator can provide desired performance in this regard by selecting the number of hash functions (and corresponding tables) used by the model and/or the number of entries in each table. Once configured and placed in use, the first component PDM 904 will encounter and store additional instances of passwords as users choose new passwords. At a certain point, the growth of the first component PDM 904 may cause it to drift away from its original false positive rate $a_{original}$. This may cause it to generate too many false positives, e.g., at a rate of $a_{increased}$. This, in turn, may frustrate users who are unnecessarily asked to select new passwords.

To address this situation, the administrator can generate the second component PDM 906 by training a new model based on a set of passwords. The new set of passwords may represent a smaller pool of observations compared to the number of passwords represented by the first component PDM 904. More specifically, the administrator can design the second component PDM 906 so that it exhibits a desired false positive rate b, which, when combined with the first component PDM 904, produces an overall false positive rate c that is lower than $a_{increased}$. The second component PDM 906 can also provide its own integer popularity threshold and counting limit (if used) based on the number of passwords it has observed.

More specifically, it is assumed that the component PDMs (904, 906) will exhibit independent probabilities of generating false positives. This means that the overall false positive rate of the aggregate PDM 902 will equal the product of the false positive rate of the first component PDM 904 and the false positive rate of the second PDM 906 (because the chances of two independent events occurring is the product of the probabilities of the two events). For example, assume that the false positive rate of the first component PDM 904 grows from $a_{original}$=2% to $a_{increased}$=3%. An administrator may opt to add the second component PDM 906 having a false positive rate of b=50%. The aggregate PDM 902 produced thereby has an overall false positive rate of c=1.5% (e.g., because 0.03*0.5=0.015), which thereby returns the performance of the aggregate PDM 902 to within an acceptable range (according to the expectations of one particular environment).

The administrator can add further component PDMs in the above-indicated manner to tune the performance of the PDM 902. This provision provides a flexible means to provide desired performance of the PDM 902 over extended use of the PDM 902 without reconfiguring the entire PDM 902 from "scratch."

B. Illustrative Processes

FIGS. 10-14 show procedures that explain the operation of the PDMs of Section A in flowchart form. Since the principles underlying the operation of the PDMs have already been described in Section A, certain operations will be addressed in summary fashion in this section.

Figure 10:
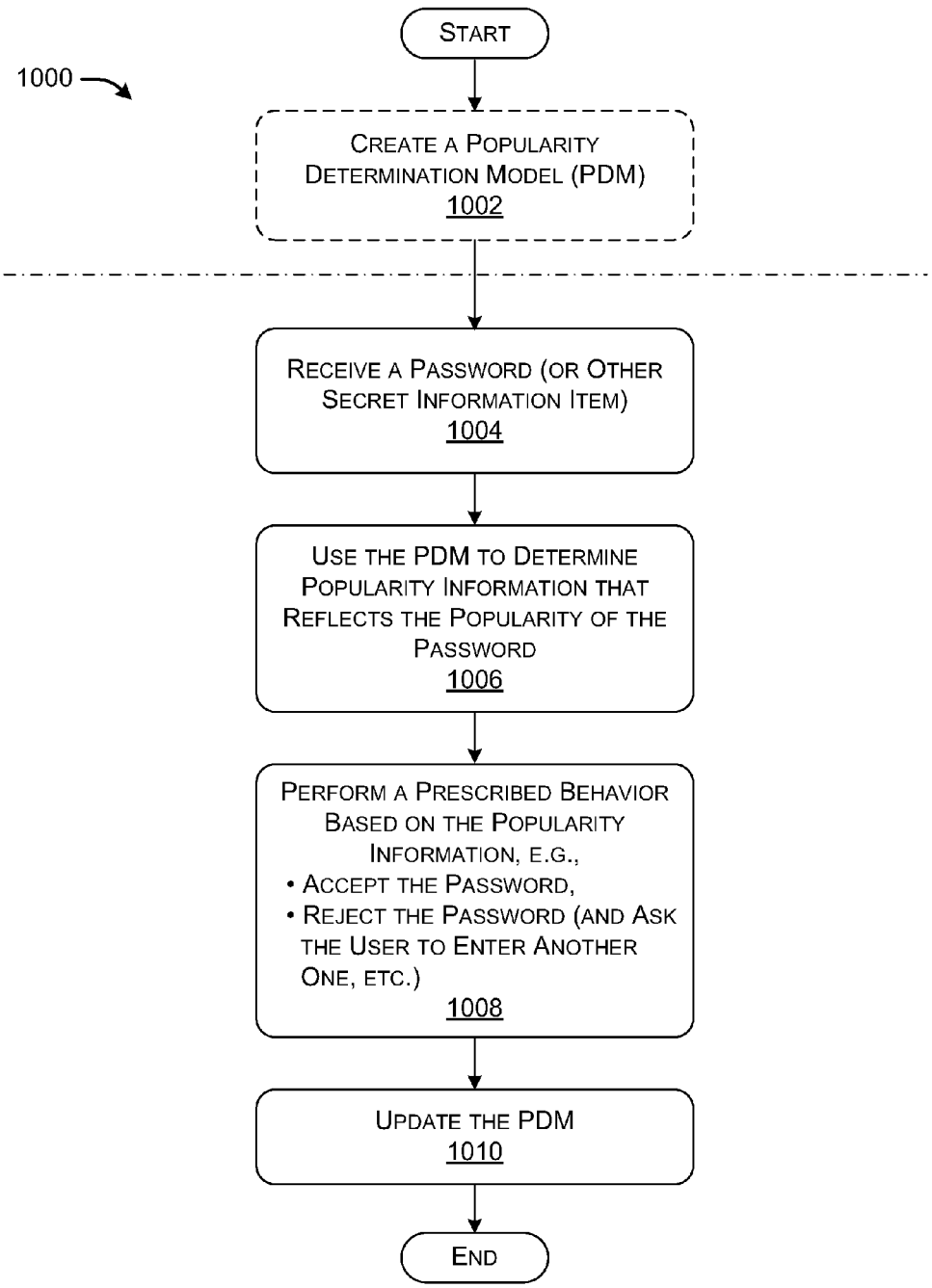
FIG. 10 shows an illustrative procedure that provides an overview of one manner of operation of the PDM of FIG. 1.

Starting with FIG. 10, this figure shows an illustrative procedure 1000 that provides an overview of one manner of operation of the PDM 102 of FIG. 1. In block 1002, an administrator can create the PDM 102. This operation may involve feeding an initial set of passwords (or other secret information items) to the PDM 1002. This operation trains or configures the PDM 102 by establishing an initial collection of count values in the table(s). The administrator can obtain the initial set of passwords from various sources. For example, assume that the administrator is affiliated with one or more online services. If authorized to do so, the administrator can feed the passwords that have already been selected by the users of these services to the PDM 102 for processing.

In addition, or alternatively, the administrator can provide set-up functionality which initially sets a state of each account of an online service to "false." Then, when a user logs in using a password, the set-up functionality can submit the user's password to the PDM 102 for processing. The processing entails adding the password to the table(s) if it is not already present, or incrementing the count value(s) in the table(s) if it is already present. The set-up functionality then sets the state of the account to "true." If the same user logs in again with the same password, the set-up functionality will detect that the state is set to true; the set-up functionality will then forego the above-described configuration tasks.

In addition, or alternatively, the administrator can artificially set the count values in the table(s) for certain passwords. For example, suppose that the administrator believes, based on any evidence, that a certain set of passwords are likely to be popular. The administrator can therefore load high count values into the table(s) for these passwords, even though these passwords have not been actually observed by the PDM 102 itself. This has the effect of forbidding the use to any user of those passwords, unless the popularity threshold eventually exceeds the artificial count values.

Once configured, the PDM 102 is deployed. In block 1004, the PDM 102 receives a password. In one case, for example, the PDM 102 can be configured to receive the user's password when the user has selected a new password. In block 1006, the PDM 102 uses its model to generate popularity information. The popularity information indicates, in one implementation, whether the user's password is popular.

In block 1008, the PDM 102 (or the authentication functionality which interacts with the PDM 102) performs any type of prescribed behavior in response to conclusion reached in block 1006. For example, the PDM 102 can accept the password if it has been assessed as sufficiently unpopular. Or the PDM 102 can reject the password if it determines that the password has been assessed as sufficiently popular. In that case, the PDM 102 can also invite (or request) the user to select a new password.

In addition, or alternatively, the PDM 102 can also perform other actions. For example, the PDM 102 can permit the user to select a popular password; but if selected, the PDM 102 may subject the user to additional security provisions. For example, the PDM 102 may ask a user having a popular password to respond to a CAPTCHA mechanism upon logging in. Alternatively, or in addition, the PDM 102 can reduce the number of guesses that the user is permitted when logging in.

In addition, or alternatively, the PDM 102 can permit the user to select any password (including a popular password) and offer only advice regarding the risk posed by that particular password (rather than a mandate on the choice of unpopular passwords).

In addition, or alternatively, the PDM 102 can be used in combination with rules that govern the composition of passwords. For example, a set of rules governing the complexity of passwords might insist that passwords contain at least two special characters and an upper case letter. The choice "Pa$$w0rd" might satisfy the rules and yet be a popular choice. Thus a combination of complexity rules and popularity measures can be used. For example, a minimum complexity might be imposed with rules, while recommendations might be suggested using a popularity metric.

In block 1010, the PDM 102 updates its model. This involves incrementing the count value(s) associated with the password. The updating operation can be modified in any manner described in Section A, such as by updating only the minimum count value(s). Further, the updating operation can be suspended when a count value reaches a counting limit. In one case, the updating operation (in block 1010) occurs after the popularity determination operation (in block 1006). But in another implementation, these operations can be reversed, e.g., by assessing popularity on the basis of the updated count values.

The procedure 1000 of FIG. 10 can also be used to change the status of an already-selected password. For example, assume that a user selects a password "David123." Assume that, at the time of selection, the PDM 102 indicates that the password is not unduly popular. Thus, the PDM 102 permits the user to select this password. But over time, others may select this password, causing it to eventually be classified as unduly popular. Once this happens, the authentication functionality can identify all of the user accounts which use this password. The authentication functionality can then invite (or request) the corresponding users to change their passwords.

Figure 11:
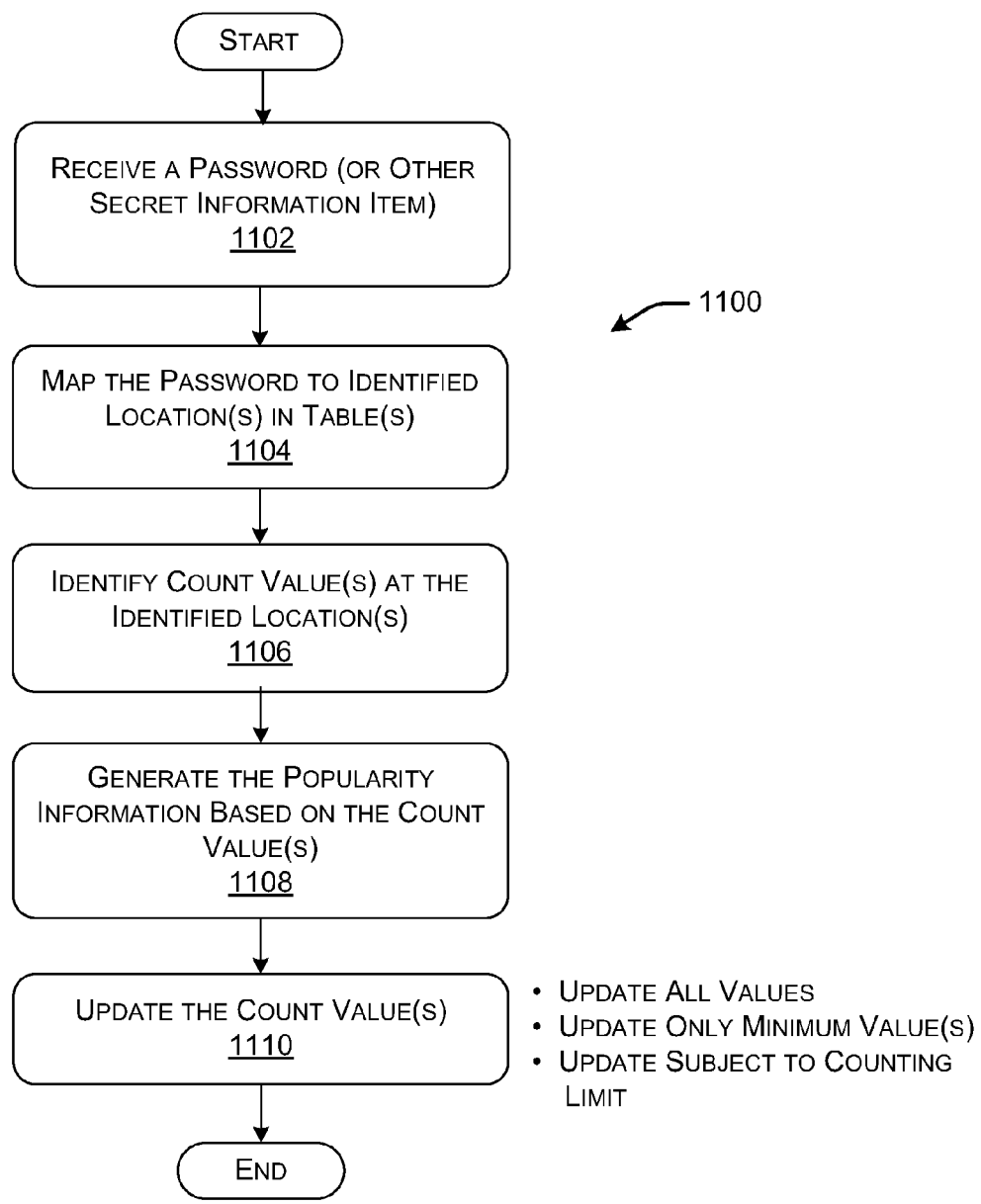
FIG. 11 shows an illustrative procedure that explains one manner of operation of the PDM of FIG. 3.

FIG. 11 shows an illustrative procedure 1100 that explains one manner of operation of the PDM 302 of FIG. 3. In block 1102, the PDM 302 receives a password. In block 1104, the PDM 302 maps the password to identified locations in the tables, e.g., by using a plurality of hash functions that provide a plurality of location addresses. In block 1106, the PDM 302 reads the count values stored at the locations determined in block 1104. In block 1108, the PDM 302 generates popularity information based on the count values, e.g., by selecting the minimum count value and determining whether this value exceeds the integer popularity threshold (d). In block 1110, the PDM 302 updates the count values at the identified locations.

FIG. 12 shows an illustrative procedure 1200 for converting a count-based model (which provides count values) to a binary-based model (which provides yes/no indications of popularity). In block 1202, an administrator produces a count-based model and then deploys it in the field. In block 1204, the administrator may convert the count-based model to a binary-based model in the manner described above in connection with FIG. 7. In block 1206, the administrator may forward the binary-based model to a computing device for use by that device in an offline mode of operation.

FIG. 13 shows an illustrative procedure 1300 for producing and using the PDM 902 of FIG. 9 that includes two component PDMs (904, 906). In block 1302, an administrator can generate the first component PDM 904. In block 1304, the administrator can generate the second component PDM 906. As described above, the administrator may create the second component PDM 906 upon observing that the first component PDM 904 is producing too many false positives. In block 1306, the resultant combined PDM 902 can be deployed. The PDM 902 assesses a password as popular only if there is consensus by the two component PDMs (904, 906) that the password is popular.

Figure 14:
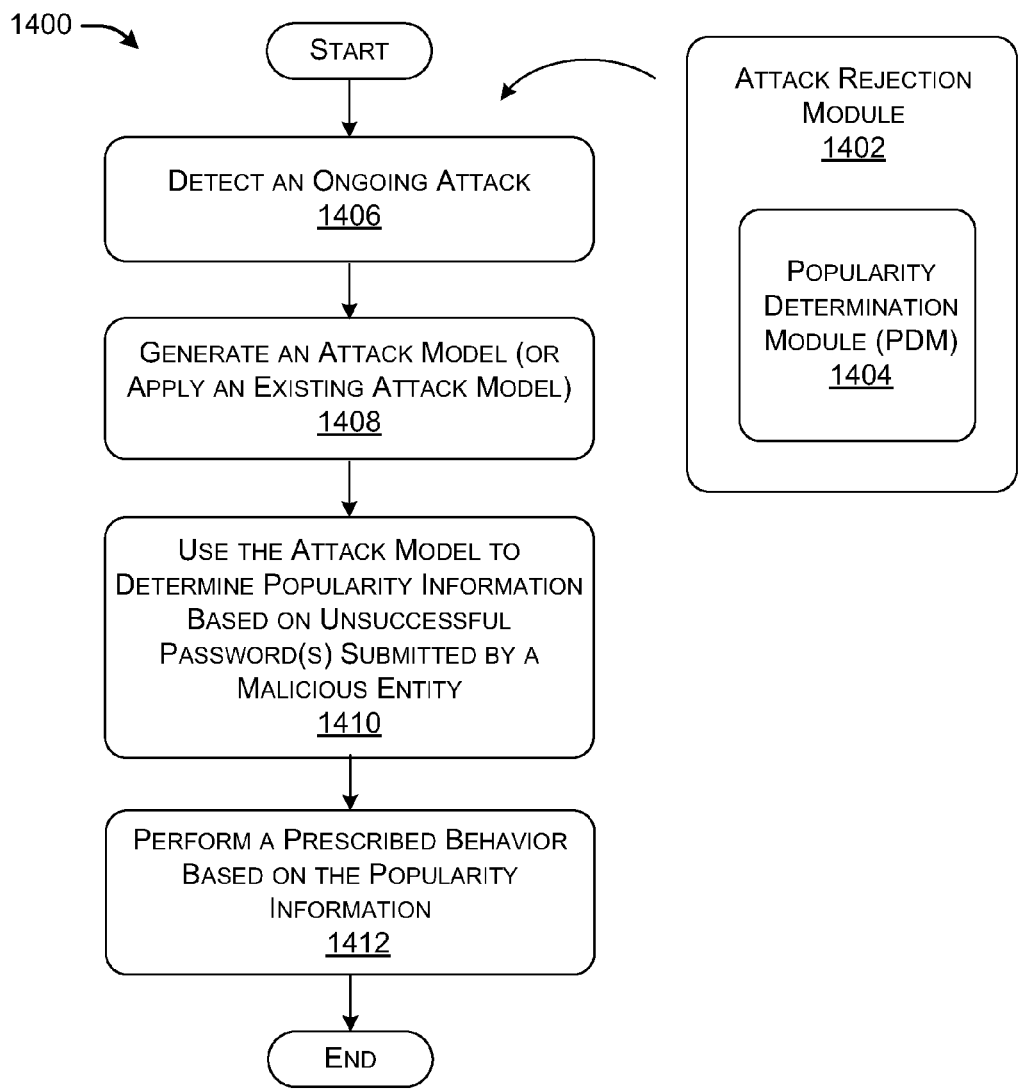
FIG. 14 shows an illustrative procedure for using a PDM to determine the popularity of passwords submitted in a presumed guessing attack, rather than passwords submitted by non-malicious end users.

FIG. 14 shows an illustrative procedure 1400 performed by an attack rejection module 1402 upon detecting a statistical guessing attack. In this approach, the attack rejection module 1402 creates a PDM 1404 using incorrect passwords submitted by entities, including both malicious entities and "legitimate" users. The passwords are incorrect insofar as they do not match the valid passwords associated with respective user accounts, which are stored by the authentication functionality. The attack rejection module 1402 uses the PDM 1404 to reduce the effectiveness of an ongoing attack by a malicious entity.

More specifically, in block 1406, the attack rejection module 1402 detects events that may potentially represent an ongoing attack by an entity. For example, the attack rejection module 1402 can detect that an entity appears to be repeatedly testing a group of passwords to gain access to the accounts of an online service, and, in the process, is entering a large number of incorrect passwords. In response, in block 1408, the attack rejection module 1402 builds the PDM 1404. More specifically, the PDM 1404 builds count values which are based on incorrect passwords submitted in the attack by any entity, including both malicious entities and legitimate users. This is in contrast to the PDM 120 described above, which, in one implementation, builds count values based on passwords that are submitted in a password registration process. These passwords are considered de facto correct; any password submitted in a registration process may or may not have a corresponding entry in the table 208.

Once generated, in block 1410, the attack rejection module 1402 uses the PDM 1404 to detect popular (and therefore proscribed) passwords that are possibly being submitted by one or more malicious entities. In block 1412, upon detecting popular "attack" passwords, the attack rejection module 1402 can perform any behavior designed to thwart such an attack. For example, the attack rejection module 1402 can refuse to accept the passwords. Alternatively, or in addition, the attack rejection module 1402 can request the submitter of the passwords to respond to a CAPTCHA mechanism or the like. Alternatively, or in addition, the attack rejection module 1402 can reduce the number of guesses that an entity is permitted make when logging onto a service using the passwords.

In one implementation, the PDM 1404 generated in block 1406 is intended for use during the guessing attack and is retired thereafter. The attack rejection module 1402 will generate another PDM 1404 upon detecting another attack at another time. This is appropriate because each attack may attempt to exploit different candidate passwords. As a final note, the procedure shown in FIG. 14 can be performed in conjunction with the procedure shown in FIG. 10, or as a separate process.

The above procedure can be modified in different ways. In one approach, the attack rejection module 1402 can remove the counts associated with incorrect passwords submitted by an entity if that entity eventually submits a correct password within an accepted number of tries. This helps separate the contribution of legitimate users (who may submit incorrect passwords due to carelessness) and malicious entities (who submit incorrect passwords in a concerted effort to gain unauthorized access to accounts).

C. Representative Processing Functionality

FIG. 15 sets forth illustrative electrical data processing functionality 1500 that can be used to implement any aspect of the functions described above. With reference to FIG. 1, for instance, the type of processing functionality 1500 shown in FIG. 15 can be used to implement any aspect of user device 104, and/or the PDM 102, and/or the online service 106, and so on. In one case, the processing functionality 1500 may correspond to any type of computing device that includes one or more processing devices.

The processing functionality 1500 can include volatile and non-volatile memory, such as RAM 1502 and ROM 1504, as well as one or more processing devices 1506. The processing functionality 1500 also optionally includes various media devices 1508, such as a hard disk module, an optical disk module, and so forth. The processing functionality 1500 can perform various operations identified above when the processing device(s) 1506 executes instructions that are maintained by memory (e.g., RAM 1502, ROM 1504, or elsewhere). More generally, instructions and other information can be stored on any computer readable medium 1510, including, but not limited to, static memory storage devices, magnetic storage devices, optical storage devices, and so on. The term computer readable medium also encompasses plural storage devices.

The processing functionality 1500 also includes an input/output module 1512 for receiving various inputs from a user (via input modules 1514), and for providing various outputs to the user (via output modules). One particular output mechanism may include a presentation module 1516 and an associated graphical user interface (GUI) 1518. The processing functionality 1500 can also include one or more network interfaces 1520 for exchanging data with other devices via one or more communication conduits 1522. One or more communication buses 1524 communicatively couple the above-described components together.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A popularity determination module (PDM) for generating popularity information, comprising:
    an input module configured to receive a secret information item selected by one of a plurality of users;
    a lookup module configured to map the secret information item to at least one location in at least one table, said at least one location providing at least one count value to indicate how many times the secret information item has been selected by the plurality of users;
    an output module configured to output popularity information using at least one probabilistic model to determine whether the secret information item is popular among the plurality of users, wherein the output module determines whether a false positive rate threshold has been exceeded and uses a combination of two or more models to determine the popularity information when it is determined that the false positive rate threshold has been exceeded; and
    a count update module configured to update said at least one count value at said at least one location to reflect receipt of the secret information item.

2. The PDM of claim 1, wherein the lookup module comprises at least one hashing function that is configured to generate at least one location address as a function of the secret information item, said at least one location address pointing to said at least one location.

3. The PDM of claim 1, wherein said at least one table comprises plural tables, and wherein the lookup module is configured to generate plural location addresses that point to plural locations in the respective plural tables.

4. The PDM of claim 1, wherein said at least one count value comprises a plurality of count values, and wherein the count update module is configured to update each of the plurality of count values.

5. The PDM of claim 1, wherein said at least one count value comprises a plurality of count values having at least one minimum count value, and wherein the count update module is configured to update only said at least one minimum count value.

6. The PDM of claim 1, wherein the count update module is configured to cease updating said at least one count value beyond a counting limit.

7. The PDM of claim 1, wherein said at least one count value comprises a plurality of count values having at least one minimum count value, and wherein the output module is configured to generate the popularity information based on a minimum count value among the plurality of count values.

8. The PDM of claim 7, wherein the output module is configured to generate the popularity information by comparing the minimum count value with a threshold.

9. The PDM of claim 8, wherein the threshold is formed by multiplying a fractional popularity threshold (r) by a number of observations (N) of secret information item instances.

10. The PDM of claim 1, wherein the secret information item is regarded as an incorrect information item, with respect to a particular account, when it does not match a valid password associated the account, and wherein the popularity information indicates the frequency of submission of the incorrect information item with respect to accounts.

11. A storage device for storing computer readable instructions, the computer readable instructions when executed by one or more processing devices perform an attack rejection method for detecting and rejecting attacks comprising:

receiving a first secret information item;

determining that the first secret information item is incorrect for a particular account in a plurality of user accounts;

storing the first secret information item as an incorrect information item;

receiving a second secret information item;

determining that the second secret information item is incorrect;

determining whether the second secret information item is popular based on a probabilistic model that generates popularity information;

determining whether a false positive rate threshold has been exceeded;

using an additional model in combination with the probabilistic model to generate the popularity information when it is determined that the false positive rate threshold has been exceeded; and determining whether there is an attack based on whether the second secret information item is popular.

12. The storage device of claim 11, further comprising refusing to accept any further secret information item attempts when an attack is determined.

13. The storage device of claim 11, further comprising requesting a response to a CATPCHA mechanism when an attack is determined.

14. The storage device of claim 11, further comprising reducing a number of guesses that are permitted for secret information items when an attack is determined.

15. A storage device for storing computer readable instructions, the computer readable instructions when executed by one or more processing devices perform a popularity determination method for analyzing secret information items comprising:

receiving a secret information item selected by one of a plurality of users;

using one of a plurality of models to generate popularity information which indicates whether the secret information item is popular among the plurality of users;

determining whether a false positive rate threshold has been exceeded;

using at least two of the plurality of models in combination to generate the popularity information when it is determined that the false positive rate threshold has been exceeded;

accepting the secret information item if the secret information item is determined to be not popular; and rejecting the secret information item if the secret information item is determined to be popular.

16. The storage device of claim 15, wherein at least one of the plurality of models is a non-probabilistic model.

17. The storage device of claim 15, wherein at least one of the plurality of models is a probabilistic model.

18. The storage device of claim 15, wherein each of the plurality of models is designed with its own desired false positive rate.

19. The storage device of claim 18, wherein the one of the plurality of models used to generate the popularity information has a false positive rate that is higher than the false positive rate threshold and when combined with another of the plurality of models, the two models in combination have a false positive rate lower than the false positive rate threshold.

20. The storage device of claim 15, further comprising converting a plurality of count values into a plurality of corresponding binary values to indicate whether each of a set of secret information items have been assessed as popular or not.

* * * * *